Patented July 11, 1950

2,514,410

UNITED STATES PATENT OFFICE 2,514,410

PRINTING OF CELLULOSE ACETATE USING METHYL CELLULOSE AS A THICKENER FOR STRONGLY ALCOHOLIC DYE SOLUTIONS

Henry Charles Olpin and Philip Broughton Law, Spondon, near Derby, England, assignors, by mesne assignments, to Celanese Corporation of America, a corporation of Delaware No Drawing. Application May 8, 1945, Serial No. 592,725

6 Claims. (Cl. 8—63)

This invention relates to the colouring of textile materials, especially textile materials of cellulose acetate, and particularly to local colouring by printing or the like.

It has been found that for the colouring of cellulose acetate textiles solutions of dyes in mixtures of lower aliphatic alcohols with water, with or without a thiocyanate, are very useful (compare British Patent No. 551,991 and British application No. 20,374/44 and the corresponding U. S. Patent No. 2,344,973, U. S. application S. No. 507,154, now U. S. Patent 2,428,835, filed October 21, 1943, and U. S. application S. No. 540,321, now abandoned, filed June 14, 1943). Such solutions are particularly effective when the proportion of alcohol exceeds 50 per cent by weight of the alcohol and water present, for example when the proportion of alcohol is from 55 to 60 per cent to 75 or 80 per cent. Using such aqueous alcohol it is possible to apply satisfactorily not only dyes which have affinity for cellulose acetate when applied from simple aqueous baths but also dyes which have little or no affinity when so applied, for example acid wool dyes and direct cotton dyes. In the case of mordant dyes the dye and a mordant metal salt can be applied in solution in the aqueous alcohol and lake formation effected by steaming (compare British Patent No. 542,180 and corresponding U. S. Patent No. 2,365,809). Using mordant dyes or acid or other dyes which have little or no affinity for cellulose acetate it is possible to obtain colourations of exceedingly good fastness to washing. Further these colourations include violet to blue and green colourations of good fastness to light and of high resistance to combustion products of coal gas, whereas the violet to blue and green dyes which have direct affinity for cellulose acetate are as a class, and insofar as they are of good fastness to light, insufficiently resistant to combustion products of coal gas.

The excellent fastness to washing, and other properties referred to above, are such as are highly desirable in the case of materials coloured locally as by printing. For local application of a dye solution, and often for uniform application as by padding or "all-over" printing, it is essential that the dye solution should be thickened and that the thickening agent should be readily removable by subsequent washing. In the case of dye solutions which are substantially aqueous in character this thickening is commonly effected with water-soluble gums such as gum tragacanth, gum arabic, and British gum and similar gum-like materials prepared from starch. It has been found however that these usual thickening agents are unsuitable for preparing printing pastes from the solutions of dyes in the aqueous alcohols referred to above. It will be appreciated that the printing paste must be uniform and of the proper consistency if even and sharply defined prints are to be obtained and of course it must be possible to wash the printed material free from thickening agent.

We have now found that solutions of dyes in an aqueous lower aliphatic alcohol of at least 50 per cent alcohol content by weight can very satisfactorily be thickened, for application by printing, padding or other mechanical impregnation method, with water-soluble methyl celluloses. In this way it is possible to prepare printing pastes which are exceedingly satisfactory both from the point of view of application to the material and of ease of removal of the thickening agent from the coloured material.

The water-soluble methyl cellulose can be made by the action of methyl chloride on alkali celluloses which have been suitably aged. Particularly useful are methyl celluloses having a methoxy content of 22 to 30 per cent and especially such as yield aqueous solutions of high viscosity, for example products which in 2 per cent aqueous solution at 25° C. have a viscosity of at least 150 centipoises. An especially useful product is a methyl cellulose having a methoxy content of 26 to 27 per cent and a viscosity of 350 to 500 centipoises measured in a 2 per cent aqueous solution at 25° C. Using such high viscosity methyl cellulose it is possible to obtain the thickening effect requisite for printing with 1 to 2 per cent based on the weight of the alcohol/water mixture.

As the lower aliphatic alcohol, ethyl alcohol, methyl alcohol, normal propyl alcohol or isopropyl alcohol can be employed. Further, a mixture of these alcohols can be used, for example a mixture of ethyl alcohol and methyl alcohol such as is present in methylated spirit.

The concentration of the alcohol in the aqueous alcohol employed is advantageously from 55 to 70 or 75 per cent by weight and particularly 60 to 70 per cent by weight. Preparations containing aqueous alcohol of these concentrations are specially suitable for the colouring of cellulose acetate textile materials. However, aqueous alcohol of still higher concentration may be employed, for example an aqueous alcohol containing up to 80 per cent by weight of anhydrous alcohol. The maximum alcohol concentration permissible in any particular case depends upon the dye employed and upon the mordant metal salt when such is used. If the concentration of alcohol in the aqueous alcohol exceeds about 70 per cent the range of acid dyes, direct cotton dyes and mordant dyes which can be dissolved therein in sufficient concentration for commercial purposes is somewhat restricted. Alcohol concentrations in excess of 70 per cent can, however, be employed when the dye to be dissolved therein is of the water-insoluble type having direct affinity for cellulose acetate.

Preparations intended for the colouring of cellulose acetate textiles advantageously contain a softening agent for this material. Water-soluble thiocyanates are very suitable for this purpose, for example ammonium thiocyanate and sodium, potassium and other alkali metal thiocyanates. For instance the colouring preparation may contain 5 to 10 per cent of one of these thiocyanates, particularly ammonium thiocyanate.

Again, such preparations may contain organic softening agents for cellulose acetate, particularly softening agents of low volatility, for example those having a boiling point above 150° C. Softening agents of this kind are di- or poly-alkylene glycols, e. g. diethylene glycol, sulphur analogues of di- or poly-alkylene glycols, e. g. thiodiglycol; tetrahydrofurfuryl alcohol, esters of hydroxy carboxylic acids e. g. ethyl lactate, and esters of di- or poly-hydric alcohols or of di- or poly-alkylene glycols e. g. monoacetin, diacetin or triacetin. The colouring preparations may for instance contain from 5 to 15 per cent of one of these organic softening agents. Thiodiglycol has been found especially useful.

Where mordant metal salts are present in the colouring preparation they can be of any of those referred to in the above-mentioned British Patent No. 542,180 and corresponding U. S. Patent No. 2,365,809. Chromium acetate has been found particularly useful.

The thickened colouring preparations of the invention can be applied to textile materials in various ways. For instance, they may be applied locally by printing, stencilling or the like, or they may be applied uniformly over the material by "all over" printing. Again, they may be applied by padding or other mechanical impregnation method of uniformly treating a textile material. In this case it is not usually necessary to employ so large a proportion of thickening agent as in the case of preparations intended for application by printing methods.

After the textile materials have been locally or uniformly impregnated with the colour preparations, it is usually desirable to steam the material in order to effect or complete the fixation of colouring matter on the material. Steaming or an equivalent hot aqueous treatment is usually essential in the case of preparations containing mordant dyes in conjunction with mordant metal salts in order to effect formation of the lake of the dye with the mordant metal.

After application of the colouring preparations and after steaming where this is employed, the textile materials may be washed to remove the thickening material. As already indicated, the methyl cellulose used to thicken the colour preparations can readily be removed by washing in cold water. A wash in hot water is usually desirable to ensure removal of thiocyanates and other constituents of the colour preparations not desired on the finishing materials.

As already indicated, the invention is primarily concerned with the colouring of cellulose acetate textile materials. In these materials the cellulose acetate fibres may be in the form of short lengths or as continuous filaments and may be present in association with other textile fibres whether natural or artificial. For example the cellulose acetate fibres may be associated with fibres of natural or regenerated cellulose e. g. cellulose fibres prepared by the viscose or cuprammonium process or cellulose fibres produced by stretching cellulose ester fibres, for instance in steam or hot water, and saponifying the stretched fibres substantially completely. When suitable dyes are employed cellulose fibres may be simultaneously coloured. In particular the colouring preparations of the invention containing mordant dyes in conjunction with a mordant metal salt, particularly chromium acetate, effectively colour cellulose fibres in shades of very good fastness to washing. These mordant dye preparations can therefore be employed in colouring textile materials consisting solely of cellulose fibres.

The colouring matter preparations of the present invention are also capable of colouring cellulose acetate textiles which have been partially saponified, for example to a degree such that they possess affinity for direct cotton dyes when applied thereto in an ordinary aqueous bath.

The following are examples of dyes which can be employed in colour preparations of the present invention:

A. Chrome dyes

Chromocitrine R (Color Index No. 441) _ (D & H)
Metachrome Orange R (Color Index No. 40) _____ (Brotherton)
Chromoxane Pure Blue B L D (Schultz Farbstofftabellen, 7th Edition, No. 1201) _ (I. G.)
Omega Chrome Brilliant Blue B. 200 (Color Index No. 720) _____ (Sandoz)
Chromazurine G (Color Index No. 879) __(D & H)
Alizarine Brilliant Green G (Color Index No. 1078) _____ (L. B. H.)

B. Other dyes

Chlorantine Fast Orange T G L L (A. A. T. C. C. Year Book 1944, Prototype 72) _____ (C. A. C.)
Solway Green G S (Schultz Farbstofftabellen, 7th Edition, No. 1201) ____ (I. C. I.)

The invention is illustrated by the following examples:

Example 1

A cellulose acetate crepe fabric is printed with a printing paste of the following composition:

2.5 grams of Solway Green GS dissolved by boiling in
87.5 grams of a 1.25 per cent solution (by weight) of water-soluble methyl cellulose in a 75/25 mixture of methylated spirit and water by volume
10 grams of thiodiglycol
———
100

The methyl cellulose is one having a methoxy content of 26 to 27 per cent and a 2 per cent aqueous solution and has a viscosity of 350 to 500 centipoises at 25° C.

The material is steamed for 15 minutes at 220 to 230° F. and then washed, first in cold water for 30 minutes and then in a 2.5 grams per litre soap solution at 40° C for 20 minutes. The material is then rinsed well in water and dried. Green prints of very good fastness to light and washing are obtained.

In place of the Solway Green GS the other dye mentioned in list B above may be used.

*Example 2*

A thickening preparation of the following composition is prepared:

| | |
|---|---|
| 68 | grams methylated spirits |
| 23 | grams water |
| 1.5 | grams water-soluble methyl cellulose as specified in Example 1 |
| 7.5 | grams ammonium thiocyanate |
| 100.0 | |

The mixture is left for 24 hours in the cold with periodic agitation whereupon solution should be complete. A printing paste of the following composition is then prepared.

| | |
|---|---|
| 2.5 | grams of chrome dye |
| 87.5 | grams of the above thickener |
| 10.0 | grams of a 40 per cent aqueous chromium acetate solution. |
| 100.0 | |

The chrome dye is dissolved by boiling in the thickener and after cooling, and immediately before printing, the aqueous solution of chromium acetate is added. Copper vessels should not be used in making up the above preparations.

The printing paste is then filtered and printed upon a cellulose acetate woven fabric. The latter is then dried at low temperature and then steamed for 15 minutes at 220 to 230° F. The printed material is then washed for 30 minutes in cold water and then for 30 minutes in a 2.5 grams per litre soap solution at 50° C. Finally it is washed off in water and dried.

The chrome dye employed may be any of those mentioned above. For example with Chromazurine G a strong greenish-blue shade is obtained and with Alizarine Brilliant Green G a bluish-green. Both shades are of very good fastness to light and of excellent fastness to soaping and other aqueous treatments. Further, they show no tendency to fade when exposed to combustion products and coal gas.

The methylated spirit employed in each of the above examples is a product made by mixing 95 parts by weight of 92 per cent ethyl alcohol (by weight) with 5 parts by weight of methyl alcohol.

Having described our invention, what we desire to secure by Letters Patent is:

1. A textile coloring composition comprising a solution of a chrome dye and chromium acetate in aqueous ethyl alcohol of 55–75% strength by weight thickened with a 1 to 2% of a water-soluble methyl cellulose having a methoxy content of 22–30% and a viscosity of at least 150 centipoises as measured in a 2% aqueous solution at 25° C.

2. A textile coloring composition comprising a solution of a chrome dye and chromium acetate in aqueous ethyly alcohol of 55–75% strength by weight thickened with 1 to 2% of a water-soluble methyl cellulose having a methoxy content of 22–30% and a viscosity of at least 150 centipoises as measured in a 2% aqueous solution at 25° C., the composition containing a softening agent for cellulose acetate, said softening agent being at the most of low volatility.

3. A textile coloring composition comprising a solution of a chrome dye and chromium acetate in aqueous ethyl alcohol of 55–75% strength by weight thickened with 1 to 2% of a water-soluble methyl cellulose having a methoxy content of 22–30% and a viscosity of at least 150 centipoises as measured in a 2% aqueous solution at 25° C., said composition containing a thiocyanate.

4. Process for the production of pattern effects on cellulose acetate textile materials, which comprises printing the materials with a solution of a chrome dye and chromium acetate in aqueous ethyl alcohol of 55–75% strength by weight thickened with 1 to 2% of a water-soluble methyl cellulose having a methoxy content of 22–30% and a viscosity of at least 150 centipoises as measured in a 2% aqueous solution at 25° C.

5. Process for the production of pattern effects on cellulose acetate textile materials, which comprises printing the materials with a solution of a chrome dye and chromium acetate in aqueous ethyl alcohol of 55–75% strength by weight thickened with 1 to 2% of a water soluble methyl cellulose having a methoxy content of 22–30% and a viscosity of at least 150 centipoises as measured in a 2% aqueous solution at 25° C., the dye solution containing a softening agent for cellulose acetate, said softening agent being at the most of low volatility.

6. Process for the production of pattern effects on cellulose acetate textile materials, which comprises printing the materials with a solution of a chrome dye, chromium acetate and a thiocyanate in aqueous ethyl alcohol of 55–75% strength by weight thickened with 1 to 2% of a water-soluble methyl cellulose having a methoxy content of 22–30% and a viscosity of at least 150 centipoises as measured in a 2% aqueous solution at 25° C., and thereafter steaming the materials.

HENRY CHARLES OLPIN.
PHILIP BROUGHTON LAW.

REFERENCES CITED

The following references are of record in the file of this patent:

UNITED STATES PATENTS

| Number | Name | Date |
|---|---|---|
| 1,968,819 | Dreyfus | Aug. 7, 1934 |
| 1,968,856 | Rivat | Aug. 7, 1934 |
| 2,080,254 | Dreyfus | May 11, 1937 |
| 2,107,852 | Bolton | Feb. 8, 1938 |
| 2,133,470 | Olpin | Oct. 18, 1938 |
| 2,248,048 | Allan | July 8, 1941 |
| 2,344,973 | Croft | Mar. 28, 1944 |
| 2,344,974 | Croft | Mar. 28, 1944 |
| 2,365,809 | Ellis | Dec. 26, 1944 |
| 2,384,001 | Wesson | Sept. 4, 1945 |
| 2,428,836 | Croft | Oct. 14, 1947 |

FOREIGN PATENTS

| Number | Country | Date |
|---|---|---|
| 494,267 | Great Britain | Oct. 24, 1938 |

OTHER REFERENCES

"Principles and Practice of Textile Printing," by Knecht and Fothergill, London, 1936, third edition, Charles Griffin Co., Ltd., pages 138 and 139.

Certificate of Correction

Patent No. 2,514,410                                July 11, 1950

HENRY CHARLES OLPIN ET AL.

It is hereby certified that error appears in the printed specification of the above numbered patent requiring correction as follows:

Column 1, line 19, for "55 to 60" read *55 or 60*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*